Aug. 6, 1929.                W. S. PATEMAN                1,723,558
                MACHINE FOR THE MANUFACTURE OF LATH BLINDS
                    Filed Oct. 10, 1928        4 Sheets-Sheet 1
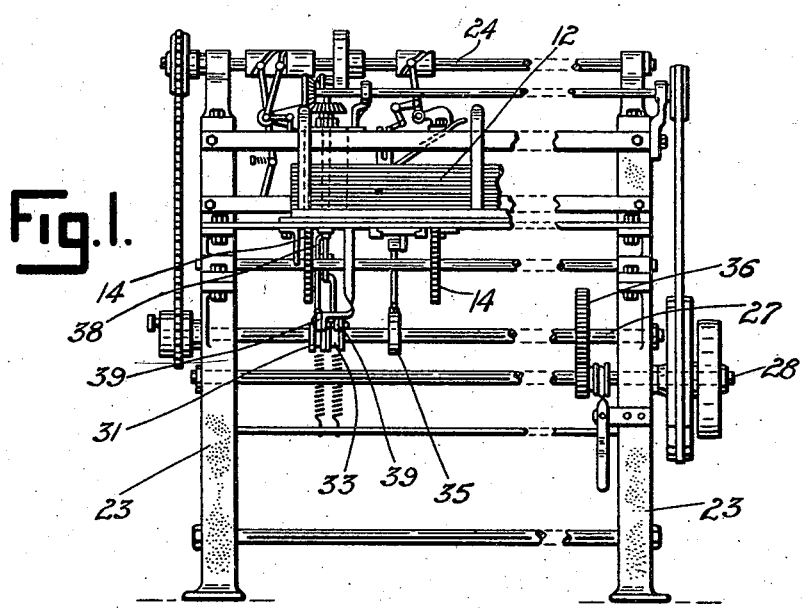
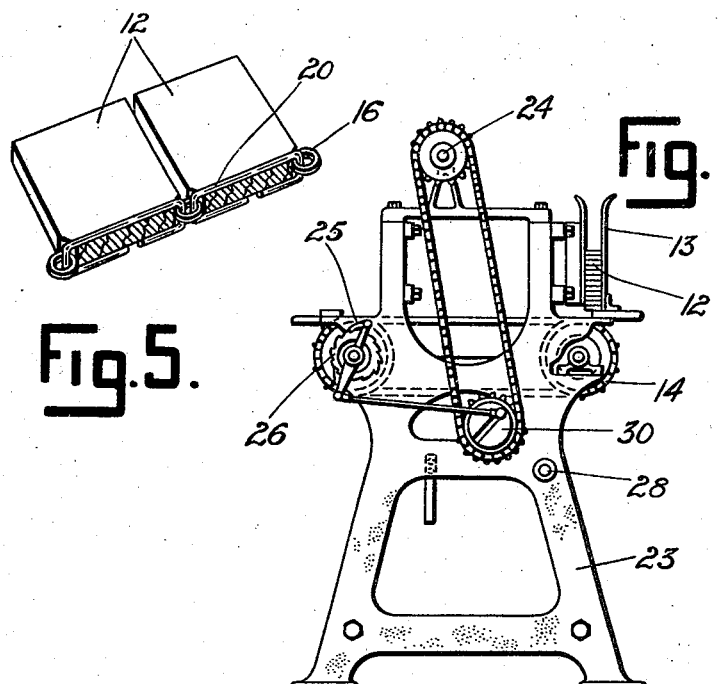

Aug. 6, 1929. W. S. PATEMAN 1,723,558
MACHINE FOR THE MANUFACTURE OF LATH BLINDS
Filed Oct. 10, 1928 4 Sheets-Sheet 2
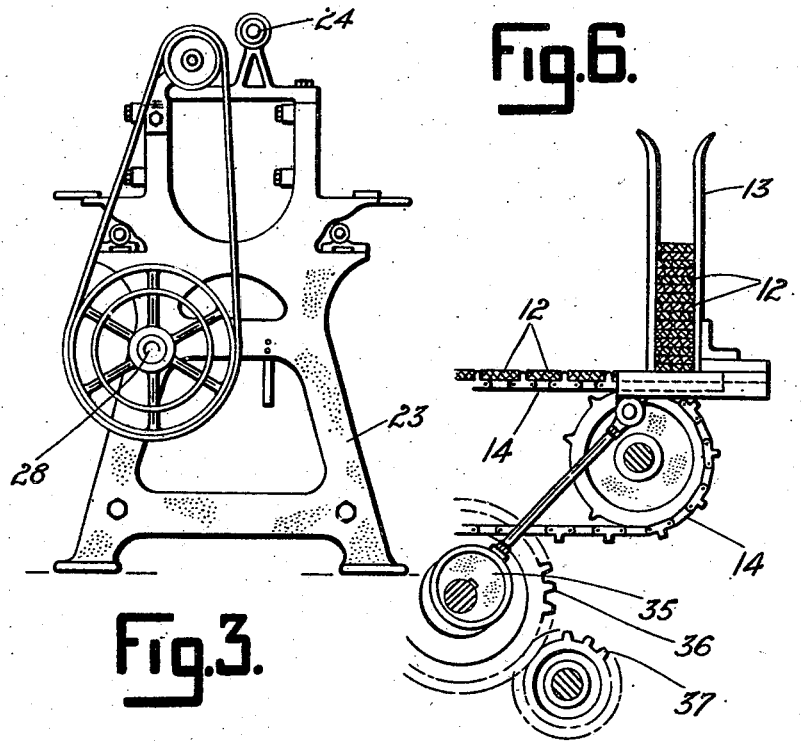
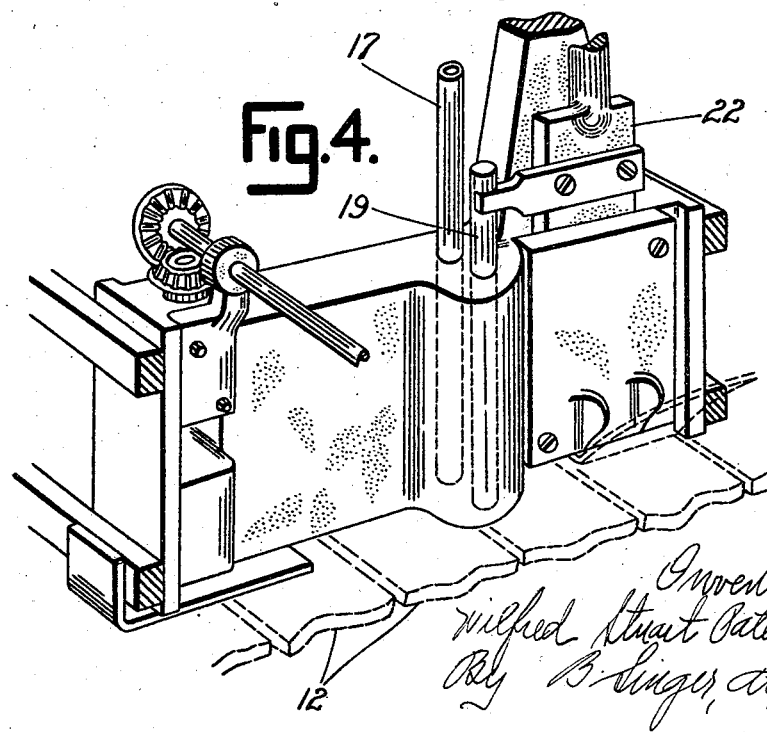

Aug. 6, 1929.   W. S. PATEMAN   1,723,558
MACHINE FOR THE MANUFACTURE OF LATH BLINDS
Filed Oct. 10, 1928   4 Sheets-Sheet 3

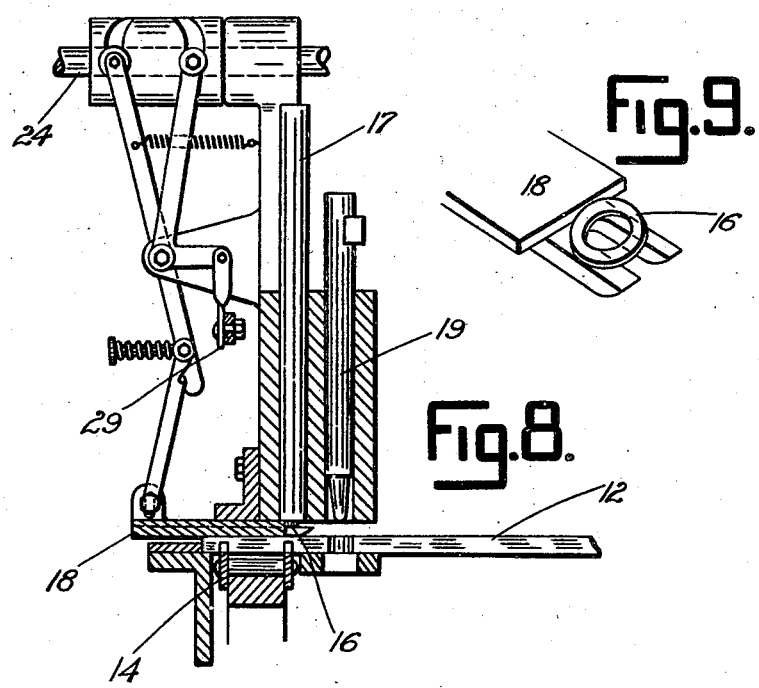
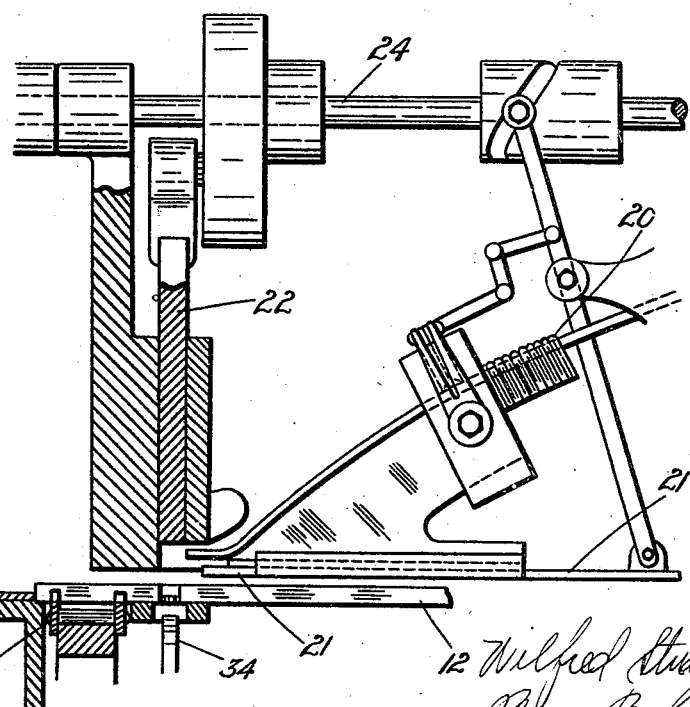

Patented Aug. 6, 1929.

1,723,558

UNITED STATES PATENT OFFICE.

WILFRED STUART PATEMAN, OF SYDNEY, NEW SOUTH WALES, AUSTRALIA.

MACHINE FOR THE MANUFACTURE OF LATH BLINDS.

Application filed October 10, 1928, Serial No. 311,700, and in Australia October 18, 1927.

This invention relates to an improved machine for the manufacture of lath blinds adapted to form a shade from the glare of the sun, and/or a protection against the action of wind and rain.

The invention particularly relates to the manufacture of blinds from timber laths chained together so as to form a chain linked lath blind.

At the present time blinds of this nature have to be assembled and linked together by hand which method is costly and laborious.

An object of the present invention is to devise a machine which automatically feeds the laths into position for drilling or cutting, places a link over the hole, feeds a staple into two adjacent links, bends the ends of the staple over and presses them into contact with the lath, and then feeds the formed blind from the machine.

A further object of the invention is to devise a machine of the above type and wherein the chain links may be formed simultaneously at various distances from each other.

According to the invention the laths are placed in a hopper and are fed by a chain conveyor into a position to be engaged by a drill or cutter or a punch. Links are then fed from a tube onto a slide or plunger which carries them into position above the hole or cut away portion of the lath ready to receive a staple. The staples are fed one by one and are carried forward by a reciprocating slide or the like so that the points are guided towards the links and pushed therethrough by a reciprocating member which holds them firmly while the ends are turned over into engagement with the underside of the lath. After the above operation, the lath is advanced towards the rear of the machine and another lath similarly connected thereto.

The frame of the machine is mounted upon end members and supports one or more operating heads, comprising drilling or cutting mechanism, staple feeding mechanism, link feeding mechanism, staple holding mechanism, and staple bending mechanism; and a transverse shaft upon which operating means are mounted to impart the desired movement to the above mechanism. The transverse shaft may extend for the whole length of the machine and operate the heads individually or simultaneously.

The chain conveyor for the lath is intermittently rotated by pawl and ratchet gear from a drive shaft carried by the frame end members.

The drill or cutter is rotated continuously from the power shaft and is fed up and down to allow the lath to pass in steps through the machine.

The end members also carry a lower drive shaft which has mounted thereon a slotted coupling for adjustably regulating the feed of the chain conveyor, a cam for operating a punch and one of the bending members for the staple, a cam for operating a second bending member, an eccentric for operating mechanism to feed the laths from the hopper to the conveyor chain, and a spur wheel whereby said drive shaft is rotated from a power shaft.

But in order that the invention may be more readily understood, reference will now be made to the accompanying drawings wherein, Figure 1 is a front elevation of the machine.

Figure 2 is a left hand end view of the machine.

Figure 3 is a right hand end elevational view.

Figure 4 is a perspective view showing one of the operating heads.

Figure 5 is a perspective view partly in section showing the method of connecting the laths by means of staples and links.

Figure 6 is an enlarged detail view showing the lath feeding mechanism.

Figure 8 is an elevational view partly in section showing the link feeding mechanism.

Figure 9 is a detail view of the end of the link feeding member.

Figure 10 is an elevational view partly in section showing the staple feeding mechanism.

Figure 11:
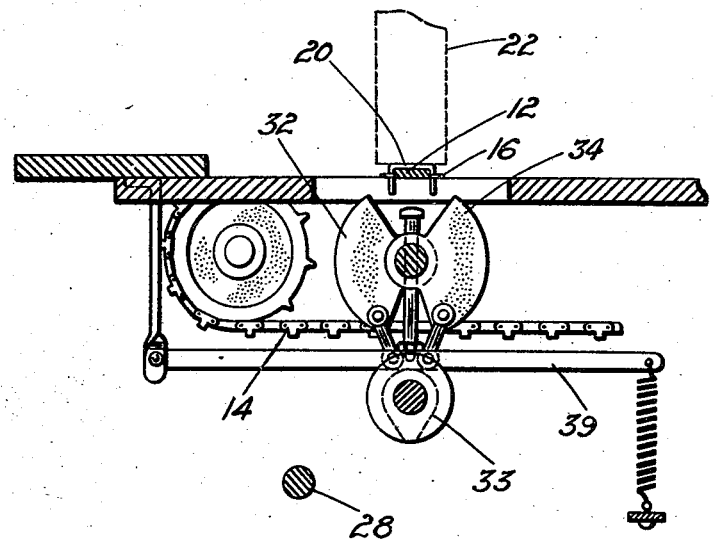
Figure 11 is a sectional elevation of the mechanism for bending the staples after being placed in position.

According to the invention, the laths 12 are placed in a hopper 13 and are fed by a chain conveyor 14 into a position to be engaged by a drill 15 or a cutter, or a punch. Links 16 are then fed from a tube 17 onto a slide 18 which carries them into position above the hole or cut away portion of the lath into which they are pressed by a plunger 19 ready to receive a staple 20. The staples 20 are fed one by one by trip mechanism, see Figure 10, and are carried forward by a reciprocating slide 21 so that the points are guided towards the links 16 and are pushed therethrough by a reciprocating member 22 which holds them firmly while the ends are turned into engagement with the underside of the lath 12, see Figure 11. After the above operation, the lath 12 is advanced towards the rear of the machine and another lath similarly connected thereto.

Figure 7:
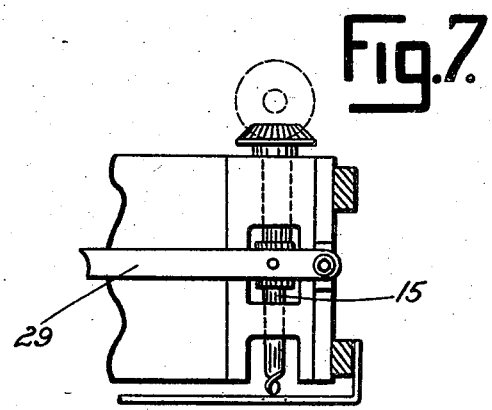
Figure 7 is an elevational view of the drilling mechanism.

The frame of the machine is mounted upon end members 23 and supports one or more operating heads, Figure 4, comprising drilling or cutting mechanism, Figure 7, staple feeding mechanism, Figure 10, and link feeding mechanism, Figures 8 and 9, staple holding mechanism, Figure 10, and staple bending mechanism, Figures 10 and 11, and a transverse shaft 24 upon which operating means are mounted to impart the desired movement to the above mechanism. The transverse shaft 24 may extend for the whole length of the machine and operate the heads shown in Figure 4 individually or simultaneously.

The chain conveyor 14 for the lath 12 is intermittently rotated by a pawl 25 and ratchet 26 from a drive shaft 27 carried by the frame end members 23.

The drill or cutter is rotated continuously from the power shaft 28 and is fed up and down by an arm 29, see Figures 7 and 8, to allow the lath to pass in steps through the machine.

The drive shaft 27 has mounted thereon a slotted coupling 30 for adjustably regulating the feed of the chain conveyor 14, a cam 31 for operating a punch 38 and one of the bending members 32 for the staple, a cam 33 for operating a second bending member 34, an eccentric 35 for operating mechanism to feed the laths from the hopper 13 to the chain conveyor 14, and a spur wheel 36 and pinion 37 whereby said drive shaft 27 is rotated from a power shaft 28. As shown in Figure 11, the bending members 32 and 34 are connected respectively to levers 39 one of which is shown in this figure engaging the cam 33. The other cam 31 functions to operate the second lever 39 upon which the punch 38 is mounted.

In operation the laths to form the blind are placed in the hopper 13 and are fed by the chain conveyor 14 into a position to be drilled or punched after which the links are placed in position over the drilled or punched holes ready to receive the staples. The staples are fed by the trip mechanism one at a time and are carried forward by the reciprocating slide 21 which guides their pointed ends towards the links through which they are pushed by the reciprocating member 22, one point entering each link. The member 22 holds the staples firmly while their ends are turned over against the lower face of the lath by the bending members 32 and 34, and pressed down by the punch 38. The joined lath is now advanced towards the rear of the machine and another lath takes its place, the operation being repeated until the desired length of blind is obtained.

Although only one operative head is described and illustrated it will be understood that as many heads as desired may be mounted between the two members all of which heads being operated in a similar manner to that already described.

I claim:

1. A machine for the manufacture of lath blinds, in combination, conveyor means for feeding laths from a hopper into position for receiving a fastener, mechanism for feeding and positioning a link adjacent to the meeting edges of two laths and mechanism for feeding, positioning, holding and bending staples adapted to pass through said links and secure one lath to the next adjacent lath.

2. A machine for the manufacture of lath blinds, comprising conveyor means for feeding laths to one or more operating heads, said heads having mechanism for drilling or cutting holes on the edge of each lath, mechanism for feeding and positioning a link above said holes, mechanism for feeding a staple through said links, mechanism for holding the staple while being bent against the underside of the lath by bending mechanism.

3. A machine for the manufacture of lath blinds, comprising an intermittently operated conveyor for feeding laths from a hopper to drilling mechanism, drilling mechanism carried by an operating head, mechanism for feeding and positioning a link above holes formed by said drilling mechanism, cam operated mechanism for intermittently feeding a staple to each link, mechanism for holding the staples above the laths and mechanism for bending the staple against the under surface of the lath.

4. A machine for the manufacture of lath blinds, comprising an intermittently operated conveyor for feeding laths from a hopper to drilling mechanism, drilling mechanism carried by an operating head, mechanism for feeding and positioning a link above holes formed by said drilling mechanism, cam operated mechanism for intermittently feeding a staple to each link, a reciprocating member for holding the staples above the laths, and cam operated members for bending the ends of said staples against the under side of the laths.

5. A machine for the manufacture of lath blinds, comprising an intermittently operated conveyor for feeding laths from a hopper to drilling mechanism, drilling mechanism carried by an operating head, a slide for feeding links from a feed tube into a position above holes formed by said drilling mechanism, a plunger for positioning said links in said holes, cam operated mechanism for feeding staples to each link and bending mechanism for securing the staples beneath the laths.

In witness whereof I have hereunto set my hand.

WILFRED STUART PATEMAN.